United States Patent [19]
Blewitt

[11] Patent Number: 5,228,545
[45] Date of Patent: Jul. 20, 1993

[54] INTERNAL SHOE DRUM BRAKE

[75] Inventor: Andrew J. Blewitt, Gwent, Wales

[73] Assignee: Lucas Industries public limited company, United Kingdom

[21] Appl. No.: 788,368

[22] Filed: Nov. 6, 1991

[30] Foreign Application Priority Data

Nov. 8, 1990 [GB] United Kingdom ............... 9024283

[51] Int. Cl.⁵ .............................................. F16D 51/00
[52] U.S. Cl. ..................... 188/328; 188/340; 188/216
[58] Field of Search ............. 188/341, 340, 78, 325, 188/205 A, 206 A, 216, 382, 328, 331, 327, 184, 106 A

[56] References Cited

U.S. PATENT DOCUMENTS

| | | | |
|---|---|---|---|
| 2,181,029 | 11/1939 | Thomas | 188/79.57 |
| 3,626,225 | 12/1971 | Pauwels | 188/181 A |
| 3,628,008 | 12/1971 | Lacey | 188/1.11 |
| 4,216,850 | 8/1980 | Kizaki | 188/216 |
| 4,762,209 | 8/1988 | Copp | 188/328 |
| 4,811,821 | 3/1989 | Wrench | 188/79.62 |
| 4,919,239 | 4/1990 | Urban | 188/216 |

FOREIGN PATENT DOCUMENTS

| | | | |
|---|---|---|---|
| 1246418 | 9/1971 | United Kingdom | 188/340 |
| 2106203 | 4/1983 | United Kingdom | 188/325 |

*Primary Examiner*—Robert J. Oberleitner
*Assistant Examiner*—Kevin D. Rutherford
*Attorney, Agent, or Firm*—Staas & Halsey

[57] ABSTRACT

An internal shoe drum brake having a generally C-shaped shoe return spring of which an intermediate portion is retained on the backplate and respective end portions respectively engage brake shoes. The intermediate portion of the spring is retained by a retention device secured to the brake backplate and has opposed tongues embracing a portion of the spring in such a manner as to retain the spring relative to the backplate in directions generally parallel to the latter. The retention device also retains the spring in a direction perpendicular to the backplate and may be associated with or embody a mounting device for an electrical component.

10 Claims, 3 Drawing Sheets

INTERNAL SHOE DRUM BRAKE

BACKGROUND OF THE INVENTION

1. Field of the Invention

This invention relates to an internal shoe drum brake, primarily for a motor vehicle, and having a pair of brake shoes mounted on a backplate and separable by an actuator into braking engagement with a rotatable brake drum against the action of resilient return means in the form of a generally C-shaped element of which an intermediate portion is retained on the backplate by retention means fast with the latter, and of which portions spaced longitudinally from the intermediate portion cooperate with the shoes in a manner such as to produce an inward shoe return force.

2. Description of Related Art

It has been proposed to retain the spring in a brake of this kind by providing one or more pairs of integral lugs in the backplate which define slots arranged in a plane generally perpendicular to the backplate so as to retain the spring in a direction generally parallel to the backplate. In addition, the spring is usually retained in a direction perpendicular to the backplate by way of a separate retaining device secured to the backplate. This slotted arrangement tends to create stress points in the backplate which can give rise to cracking thereof in use and one object of the invention is to provide a spring retention means which is less prone to this problem.

SUMMARY OF THE INVENTION

According to one aspect of the invention, an internal shoe drum brake of the aforesaid general kind is provided with spring retention means in the form of a separate component secured with respect to the backplate, the component having opposing portions embracing a portion of the spring in such a manner as to retain the spring relative to the backplate in directions generally parallel to the latter.

Preferably, the retention means also retains the spring in a direction perpendicular to the backplate.

With the growing use of anti-lock braking systems in vehicles, it is necessary to provide mountings for items of ancillary control equipment such as wheel speed sensors and similar devices. These are often complex, however, and can encroach upon the limited space available in the area of the spring retention means. In the brake of the present invention, a mounting for such a sensor or similar device is disposed adjacent the spring retention means and is preferably formed integrally with the latter.

BRIEF DESCRIPTION OF THE DRAWING

The invention will now be described, by way of example, with reference to the accompanying drawings in which.

DESCRIPTION OF THE PREFERRED EMBODIMENTS

Figure 1:
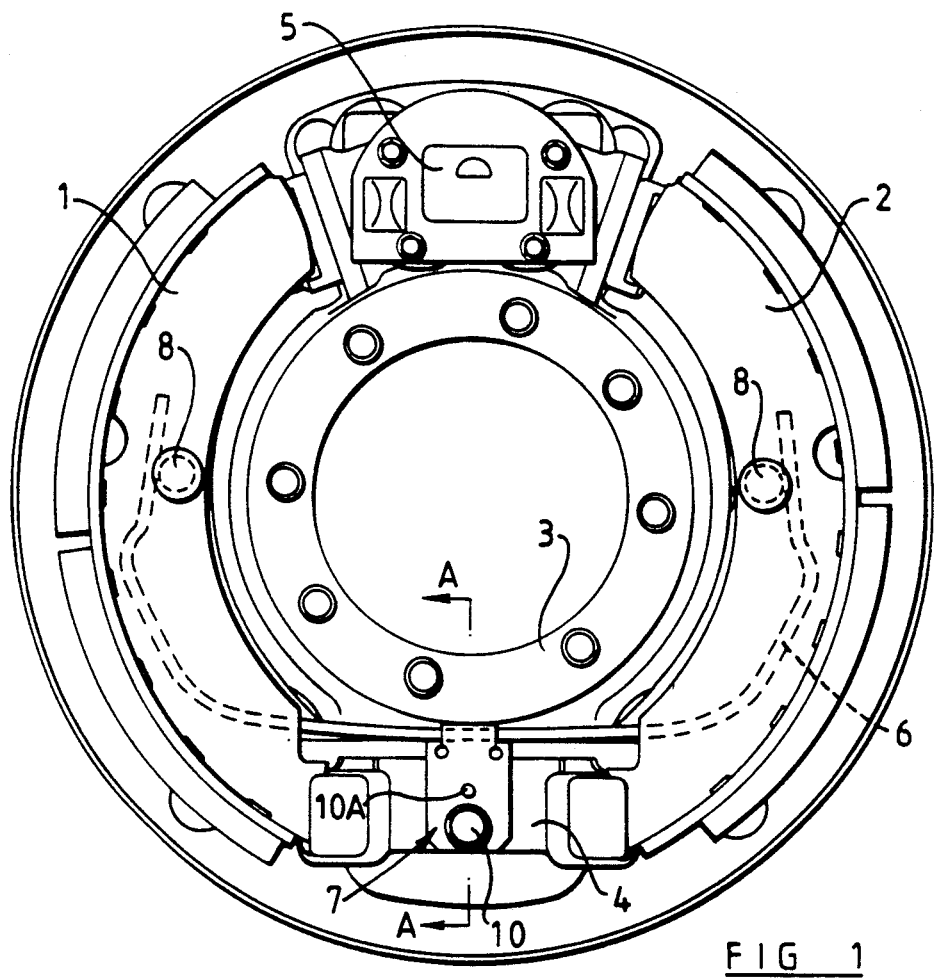
FIG. 1 is a side view of one form of the internal shoe drum brake of the invention.

The internal shoe drum brake illustrated in FIG. 1 includes a pair of brake shoes 1, 2 carried on a backplate 3 and having one pair of adjacent ends engaged with an abutment 4 fast with the backplate, being secured to or formed integrally with the latter. The other pair of adjacent shoe ends engage an actuator 5 which is operable to separate the shoes radially into braking engagement with a surrounding brake drum (not shown) against the action of a shoe return spring 6. The return spring is generally C-shaped, being retained on the backplate by a retainer 7 secured to the abutment 4, the free ends of the spring engaging against abutment pins 8 carried respectively by the shoes 1, 2, the spring being stressed in such a manner as to exert a radially inward force on the pins in order to urge the shoes continually towards their illustrated rest positions.

Figure 2:
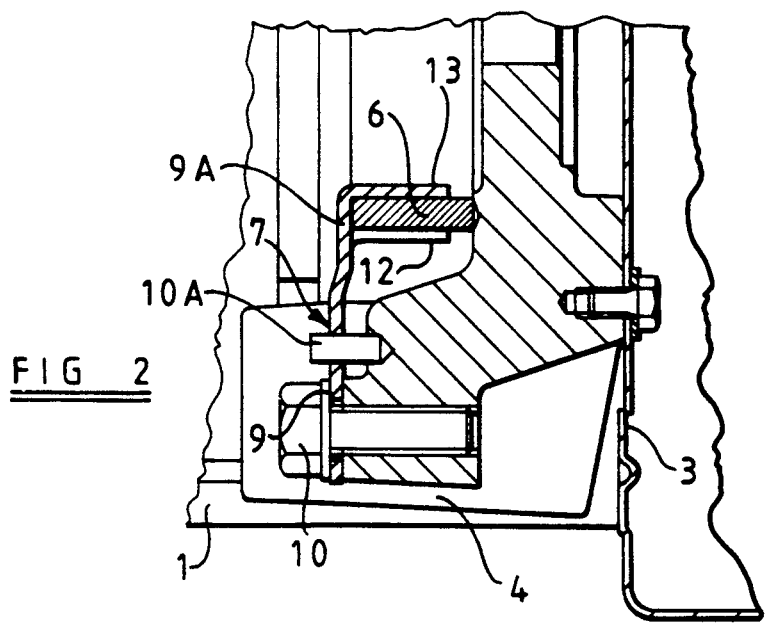
FIG. 2 is part of a cross-section along the line A—A of FIG. 1.
Figure 3:
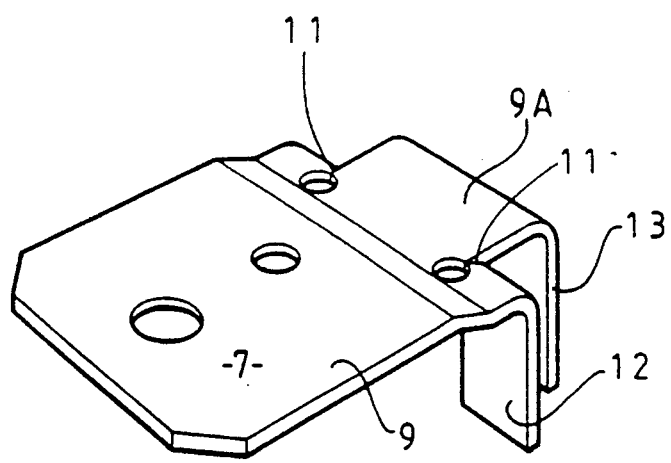
FIG. 3 is an enlarged perspective view of a component of the brake of FIGS. 1 and 2.

The invention is particularly concerned, inter alia with the manner in which the spring 6 is retained on the backplate by the retainer 7 and FIGS. 2 and 3 illustrate the retainer in greater detail. The main body of the retainer is in the form of a flat plate 9 which is secured to the abutment 4 by way of a bolt 10. A spigot connection between the retention means and backplate is formed by a dowel 10A which extends through the plate 9 into the abutment 4 at a location spaced from the bolt 10 and serves positively to prevent rotation of the retainer about the bolt axis during working of the spring. The plate 9 is provided with a pair of spaced longitudinal slots 11 extending inwardly from the intended radially inner end thereof and the two portions of the body lying laterally outwardly of the slots are bent inwardly along the slots to form a pair of spaced tongues 12. The remaining portion 9A of the plate now extending longitudinally beyond the tongues 12 is itself bent inwardly to form a further tongue 13 spaced from and extending parallel to the tongues 12. As can be seen more clearly from FIG. 2, the spacing between the tongues 12 and 13 in a direction longitudinally of the plate 9 is such as to permit the return spring 6, which can be seen to be of generally rectangular cross-section, to be closely embraced by the tongues so as to be securely retained, in use, in two opposed directions generally parallel to the backplate 3 or radially of the brake. The spring will also be seen to be retained laterally or perpendicular to the backplate between the central plate portion 9A and the opposed surface of the backplate. The retainer thus provides a very simple and convenient means for retaining the spring 6 in two mutually perpendicular directions and largely avoids the problems of stress fractures associated with some conventional arrangements in which retention slots are provided in the backplate itself.

Figure 4:
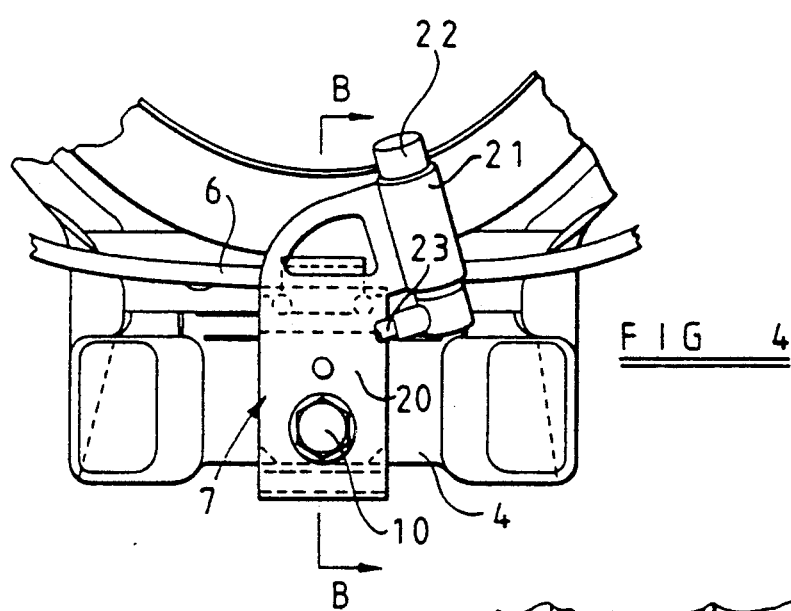
FIG. 4 is a fragmentary view showing part of a modified form of the brake of the invention.
Figure 5:
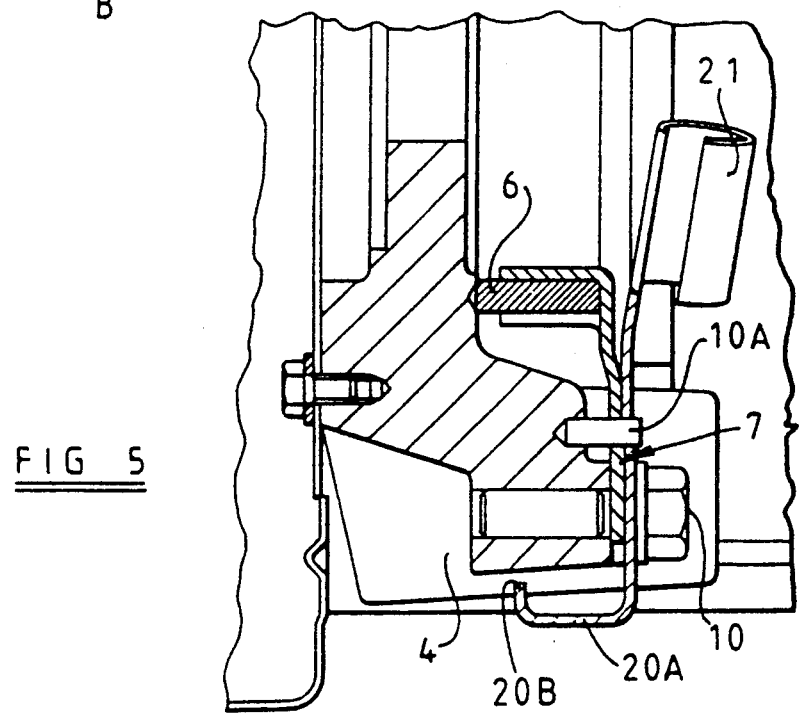
FIG. 5 is an enlarged cross-section along line B—B of FIG. 4.

FIGS. 4 and 5 illustrate part of a drum brake having a shoe return spring 6 and a spring retainer 7 identical with that illustrated in FIGS. 1 to 3, being located relative to the backplate by a dowel 10A and secured by a bolt 10, as previously. It can be advantageous to provide means adjacent the abutment 4 for supporting a wheel speed sensor or similar device and, in this embodiment, an additional bracket 20 is secured to the backplate by the bolt 10 which passes through both the bracket and plate 7, the bracket also being located by the dowel 10A. The bracket supports a part-cylindrical housing 21 which may be formed integrally with the bracket by pressing for example, or secured thereto, as by welding. The diameter of the housing 21 is such as closely to surround the aforesaid sensor or similar device 22, suitable means being provided, if necessary, to ensure the long term security of the sensor within the housing. Any suitable means, shown as an electrical cable 23, connects the sensor to appropriate ancillary e.g. anti-lock equipment elsewhere on the vehicle, in conventional manner. A portion 20A of the bracket 20 is bent inwardly at right angles to the remainder and cooperates with the backplate by way of an upstanding integral tongue 20B formed by further bending the portion 20A at right angles to itself, and may serve to mount cable or conduit means (not shown) associated with the sensor.

Figure 6:
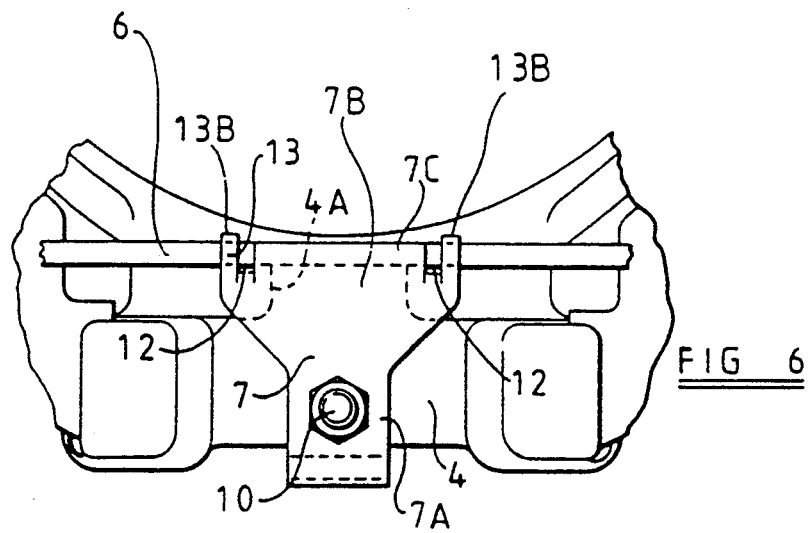
FIG. 6 shows part of a modified form of the brake of the invention.

In the alternative arrangement illustrated in FIG. 6, the retention device 7 is of generally Y-shaped outline with the stem 7A of the Y secured to the abutment 4 by means of a bolt 10 and the wider portion 7B thereof extending to a location adjacent the spring 6. The laterally extreme regions of the portion 7B are provided with respective pairs of tongues for locating the spring 6 in a direction radially of the brake. Each pair consists of a tongue 13 which extends beyond the upper surface of the spring and has an inwardly bent portion 13B extending towards the backplate and engaging the upper surface of the spring. A lower tongue 12 extends towards the backplate beneath the spring 6 so that the tongues 12 and 13 retain the spring in two opposed radial directions. An intermediate portion 7C of the retainer which lies between the pairs of tongues acts to retain the spring 6 in a direction perpendicular to the backplate. The portion 7B of the retainer may lie in the same plane as the portion 7A, or alternatively may be inwardly dished towards the backplate. Additional radial support for the spring is provided by a rectangular portion 4A of the abutment 4 which engages the underside of the spring. It would be possible to provide an asymmetrical spring retainer by effectively omitting one of the pairs of tongues 12 and 13.

Figure 7:
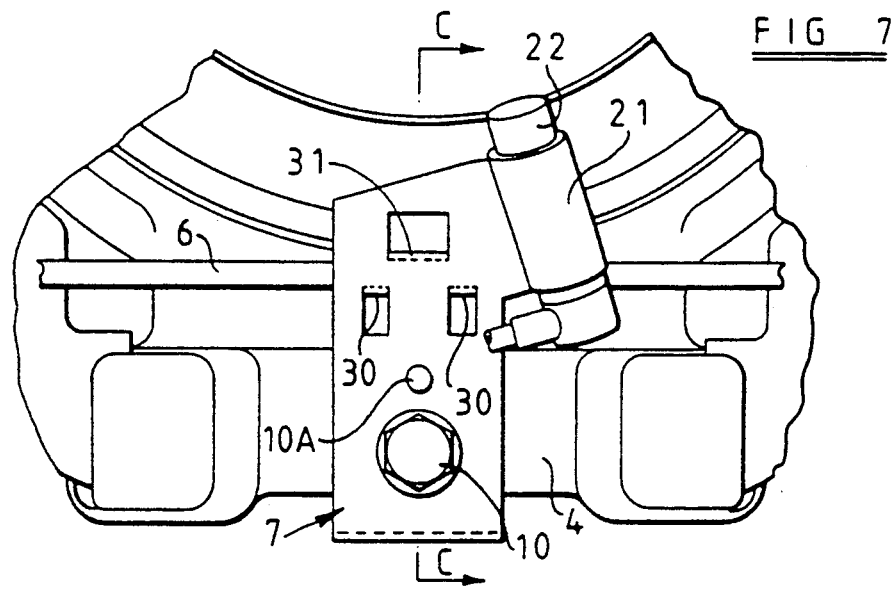
FIG. 7 is a side elevation of part of a further alternative form of the brake of the invention.
Figure 8:
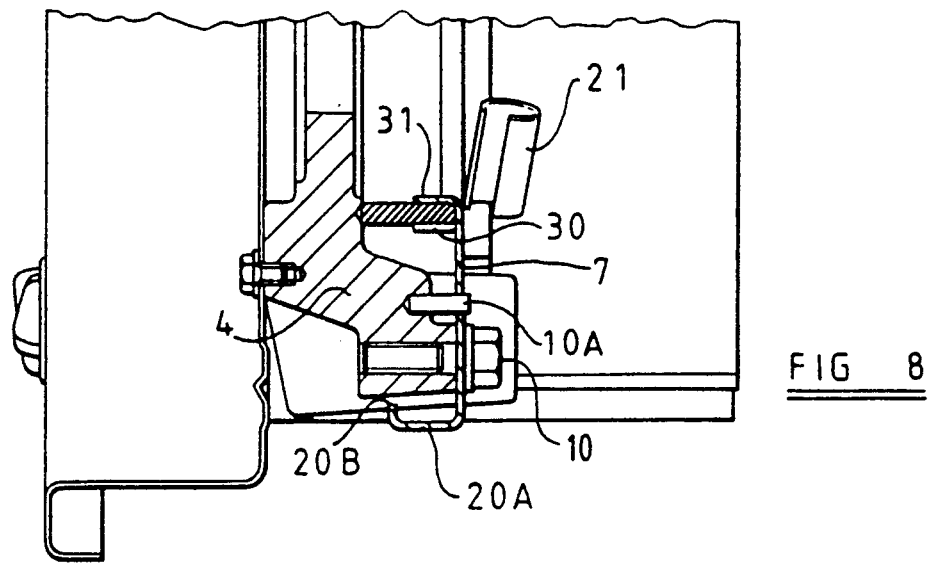
FIG. 8 is a cross-section along the line C-C of FIG. 7.

In the alternative embodiment of the brake of the invention illustrated in FIGS. 7 and 8, the spring retainer 7 and housing 21 for the sensor 22 are formed as a unitary component which is secured to the abutment 4 by a bolt 10, being located by a dowel 10A, as previously. In this embodiment, the spring 6 is retained between two spaced lower tongues 30 and an upper tongue 31 disposed generally between the lower tongues, all of which are stamped or pressed out of the solid plate. As can be seen more clearly from FIG. 7, the housing 21 is inclined slightly away from the backplate in a similar manner to the arrangement of FIG. 5, the sensor being omitted in this view for clarity of illustration. A portion 20A of the retainer is bent inwardly at right angles and further bent to provide a tongue 20B in a similar manner to the bracket 20 of FIG. 5 and for the same purpose. This particular embodiment provides the additional advantage of requiring a minimum number of manufacturing steps and only a single assembly stage in order to install both the retainer and sensor housing within the brake.

I claim:

1. An internal shoe drum brake comprising:
    a backplate;
    a rotatable brake drum;
    an actuator;
    a pair of brake shoes mounted on the backplate and separable by the actuator into braking engagement with the rotatable brake drum;
    resilient return means in the form of a generally C-shaped spring for acting against the braking engagement of the brake shoes, said return means having an intermediate portion and outer portions spaced longitudinally from the intermediate portion to cooperate with the shoes in a manner such as to produce an inward shoe return force; and
    retention means fast with the backplate for retaining the intermediate portion of the return means to the backplate, the retention means being a separate unitary component secured with respect to the backplate, and having opposed outwardly projecting tongues embracing the intermediate portion of the spring in such a manner as to retain the spring relative to the backplate in directions generally parallel to the backplate, said tongues being arranged in succession across the retention means, a first of the tongues being spaced from a second of the tongues in a direction transverse to their direction of projection by a distance substantially equal to the transverse cross-sectional dimension of said spring portion.

2. A brake according to claim 1, wherein the retention means also retains the spring in a direction perpendicular to the backplate.

3. A brake according to claim 1, wherein the retention means is secured to an abutment which is fast with the backplate and engaged with one pair of adjacent ends of the brake shoes.

4. A brake according to claim 1, wherein the retention means has a plate-like body secured to the backplate, and the outwardly projecting tongues extend generally transversely from the body and are spaced away from one another lengthwise from the body to embrace the intermediate portion of the spring.

5. A brake according to claim 1, wherein the retention means is positively located relative to the backplate by a spigot connection spaced from fixing means securing the retention means to the backplate.

6. A brake according to claim 1, wherein a mounting device for a sensor is arranged adjacent the retention means.

7. An internal shoe drum comprising:
    a backplate;
    a rotatable brake drum;
    an actuator;
    a pair of brake shoes mounted on the backplate and separable by the actuator into braking engagement with the rotatable brake drum;
    resilient return means in the form of a generally C-shaped spring for acting against the braking engagement of the brake shoes, said return means having an intermediate portion and outer portions spaced longitudinally from the intermediate portion to cooperate with the shoes in a manner such as to produce an inward shoe return force; and
    retention means stationary with the backplate for retaining the intermediate portion of the return means to the backplate, the retention means being a separate component and comprising:
    a plate-like body secured with respect to the backplate; and outwardly projecting tongues extending generally transversely from the body and being spaced away from one another lengthwise from the body, said outwardly projecting tongues embracing the intermediate portion of the spring and the portion of the body carrying the tongues being of greater width than the remainder of the body.

8. An internal shoe drum brake comprising:
a backplate;
a rotatable brake drum;
an actuator;
a pair of brake shoes mounted on the backplate and separable by the actuator into braking engagement with the rotatable brake drum;
resilient return means in the form of a generally C-shaped spring for acting against the braking engagement of the brake shoes, said return means having an intermediate portion and outer portions spaced longitudinally from the intermediate portion to cooperate with the shoes in a manner such as to produce an inward shoe return force; and
retention means stationary with the backplate for retaining the intermediate portion of the return means to the backplate, the retention means being a separate component and comprising:
a plate-like body secured with respect to the backplate; and
outwardly projecting tongues extending generally transversely from the body and arranged in succession across the body, one of the tongues being of greater transverse distance from the body than two others which are respectively at either side thereof and positioned beyond said two other tongues in a direction lengthwise from the body, said outwardly projecting tongues embracing the intermediate portion of the spring in such a manner as to retain the spring relative to the backplate in directions generally parallel to the backplate.

9. An internal shoe drum brake comprising:
a backplate;
a rotatable brake drum;
an actuator;
a pair of brake shoes mounted on the backplate and separable by the actuator into braking engagement with the rotatable brake drum;
resilient return means in the form of a generally C-shaped spring for acting against the braking engagement of the brake shoes, said return means having an intermediate portion and outer portions spaced longitudinally from the intermediate portion to cooperate with the shoes in a manner such as to produce an inward shoe return force;
retention means fast with the backplate for retaining the intermediate portion of the return means to the backplate, the retention means being a separate unitary component secured with respect to the backplate, and having opposed portions embracing the intermediate portion of the spring in such a manner as to retain the spring relative to the backplate in directions generally parallel to the backplate; and
a mounting device for a sensor arranged adjacent the retention means, the mounting device being a separate component secured to the backplate, together with the retention means, by a common fixing means.

10. An internal shoe drum brake comprising:
a backplate;
a rotatable brake drum;
an actuator;
a pair of bake shoes mounted on the backplate and separable by the actuator into braking engagement with the rotatable brake drum;
resilient return means in the form of a generally C-shaped spring for acting against the braking engagement of the brake shoes, said return means having an intermediate portion and outer portions spaced longitudinally from the intermediate portion to cooperate with the shoes in a manner such as to produce an inward shoe return force;
retention means fast with the backplate for retaining the intermediate portion of the return means to the backplate, the retention means being a separate unitary component secured with respect to the backplate, and having opposed portions embracing the intermediate portion of the spring in such a manner as to retain the spring relative to the backplate in directions generally parallel to the backplate; and
a mounting device for a sensor arranged adjacent the retention means, and mounting device being formed integrally with the retention means.

* * * * *